United States Patent
Kang et al.

(10) Patent No.: US 7,436,915 B2
(45) Date of Patent: Oct. 14, 2008

(54) FIR FILTER OF DS-CDMA UWB MODEM TRANSMITTER AND CONTROL METHOD THEREOF

(75) Inventors: Kyu Min Kang, Taejon (KR); Bub Joo Kang, Taejon (KR); Sangsung Choi, Taejon (KR); Kwang Roh Park, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 608 days.

(21) Appl. No.: 11/137,468

(22) Filed: May 26, 2005

(65) Prior Publication Data

US 2006/0120437 A1 Jun. 8, 2006

(30) Foreign Application Priority Data

Dec. 7, 2004 (KR) ...................... 10-2004-0102490

(51) Int. Cl.
*H04B 1/10* (2006.01)
(52) U.S. Cl. ...................................... 375/350
(58) Field of Classification Search .............. 375/296, 375/146, 229, 350
See application file for complete search history.

(56) References Cited

U.S. PATENT DOCUMENTS 7,185,036 B1*   2/2007 Wang et al. .................. 708/290
2002/0067765 A1*   6/2002 Lim et al. .................... 375/229
2003/0067973 A1   4/2003 Lee et al.

FOREIGN PATENT DOCUMENTS

KR          100294541          4/2001

OTHER PUBLICATIONS

Sun Young Hwang, Jong Kwan Choi, Sil Kim, Design of an Area-Efficient Interploated FIR filter Based on LUT Partitioning, 2000, Telecommunications review vol. 10, No. 5, 1049-1058.*
F. Adachi and M. Sawahashi, Wideband Multi-rate DS-CDMA for Next Generation Mobile Communications Systems, 1997, Wireless Communications Conference, 57-62.*
Kaveh Pahlavan, et al.; "Voice-Band Data Communication Modems—A Historical Review: 1919-1988"; IEEE Communications Magazines; vol. 26; No. 1; Jan. 1988; pp. 16-27.

* cited by examiner

*Primary Examiner*—Kevin M Burd
*Assistant Examiner*—Tanmay K Shah
(74) *Attorney, Agent, or Firm*—Lowe Hauptman Ham & Berner, LLP

(57) ABSTRACT

An FIR filter of a DS-CDMA UWB modem transmitter and a control method thereof are disclosed. The FIR filter includes an LUT control device for outputting a resultant value of "0" to all adders if data values corresponding to upper three chips H2, M2 and L2 and lower three chips H, M and L are "000000", and discriminating which group between a first group and a second group the upper/lower data values belong to if the upper/lower data values are not "000000". The LUT control device provides upper or lower LUT values to the adders using the upper or lower LUT values as they are, or converts the upper or lower LUT values into 2's complements and provides the converted values to the adders according to the discriminated first or second group.

15 Claims, 10 Drawing Sheets

FIR FILTER OF DS-CDMA UWB MODEM TRANSMITTER AND CONTROL METHOD THEREOF

BACKGROUND OF THE INVENTION

1. Field of the Invention

The present invention relates to an FIR (Finite Impulse Response) filter of a DS-CDMA (Direct Sequence Code Division Multiple Access) UWB (Ultra Wide-Band) modem transmitter and a control method thereof, and more particularly, to an FIR filter of a DS-CDMA UWB modem transmitter and a control method thereof that can correspond to the data transmission rate of a UWB modem that has been proposed in the present standardization by designing the FIR filter having a low complexity and a high processing speed.

2. Background of the Related Art

As is well known, the standardization of a UWB (Ultra Wide-Band) system is in progress by IEEE (Institute of Electrical and Electronics Engineers) 802.15.3a (working group for wireless personal area network), and a DS-CDMA UWB system and an MB-OFDM (Multi-Band Orthogonal Frequency Division Multiple Access) UWB system are in competition for being adopted as the standard. The present invention refers to the transmitter design of the DS-CDMA transmission system of the above-described two transmission systems.

FIG. 1 is a functional block diagram illustrating the construction of a conventional DS-CDMA UWB modem transmitter. This conventional DS-CDMA UWB modem transmitter includes a data generator 2000 for receiving data generated and transferred from a MAC (Medium Access Control) unit (not illustrated) to a MAC interface 1000, performing a scrambling, convolutional encoding, interleaving, etc., of the data, and outputting the processed data to a symbol mapper 3000, a code set modulator 4000 for receiving resultant values of the symbol mapper 3000 and spreading the resultant values to ternary codes of a length L, and an FIR filter 5000 for receiving the spreading code signals from the code set modulator 4000, pulse-shaping the code signals, and outputting the pulse-shaped code signals to a DAC (Digital-to-Analog Converter) block 6000.

Generally, in designing the above-described FIR filter 5000, two methods for designing a module that processes results of convolution between a ternary spreading code and an FIR pulse-shaping filter coefficient may be used as follows.

The first method is a method of directly performing a convolution operation by inputting the ternary spreading code to the FIR filter 5000, and the second method is a method of implementing a digital modem transmitter in a manner that it calculates in advance the resultant values of convolution, stores the resultant values in an LUT (Look-Up Table) memory provided in the FIR filter 5000, and then refers to the stored resultant values of convolution.

However, since the former is not suitable for the DS-CDMA UWB system that requires a high-speed data process in consideration of the speed of convolution operation, the latter using the LUT is used to design the FIR filter of the transmitter in the UWB modem that requires a high-speed data process. As illustrated in FIG. 2, the transmitter is designed to have a parallel processing structure for a high-speed data process, and in this case, an awfully large amount of memory is required.

FIG. 2 is a block diagram illustrating an example of the structure of the FIR filter 5000 in the DS-CDMA UWB modem transmitter under the assumption that L=24 and k=4 in the case of 1:k interpolation. For the convenience in explanation, it is exemplified that the FIR filter has the structure in which L=24 and k=4, but it can be applied to all structures in which L≧1 and all structure in which k≧1. Here, the speed of an internal clock used to obtain the pulse-shaped ternary code LUT values is the speed of a symbol clock 5205. The ternary spreading code 5210 from the code set modulator 3000 in FIG. 1 is stored in a buffer 5220 having a 48-chip size after it is passed to the FIR filter 5000, and using values 5230 to 5234 of the ternary spreading code 5210 as address values of LUT memories, the pulse-shaped ternary code values previously stored in the LUT memories 5240 to 5244 are searched and sent as output values 5250 to 5254.

Here, the ternary code having the length of L=24 for a BPSK (Binary Phase Shift Keying) transmission is described in Table 1 below. As shown in Table 1, in the case of using a frequency band of 3 to 5 GHz, the DS-CDMA UWB system can construct 6 piconets at maximum using 6 spreading codes. Table 2 below describes a bit mapping method of the ternary code.

TABLE 1

| Code Set Number | L = 24 Codes |
| --- | --- |
| 1 | -1, 0, 1, -1, -1, -1, 1, 1, 0, 1, 1, 1, 1, -1, 1, -1, 1, 1, 1, -1, 1, -1, -1, 1 |
| 2 | -1, -1, -1, -1, 1, -1, 1, -1, 1, -1, -1, 1, -1, 1, 1, -1, -1, 1, 1, 0, -1, 0, 1, 1 |
| 3 | -1, 1, -1, -1, 1, -1, -1, 1, -1, 0, -1, 0, -1, -1, 1, 1, -1, 1, 1, 1, 1, -1, -1, -1 |
| 4 | 0, -1, -1, -1, -1, -1, -1, 1, 1, 0, -1, 1, 1, -1, 1, -1, -1, 1, 1, -1, 1, -1, 1, -1 |
| 5 | -1, 1, -1, 1, 1, -1, 1, 0, 1, 1, 1, -1, -1, 1, 1, -1, 1, 1, 1, -1, -1, -1, 0, -1 |
| 6 | 0, -1, -1, 0, 1, -1, -1, 1, -1, -1, 1, 1, 1, 1, -1, -1, 1, -1, 1, -1, 1, 1, 1, 1 |

TABLE 2

| Ternary Code | Bit Mapping |
| --- | --- |
| 0 | 00 |
| 1 | 01 |
| -1 | 11 |
| Invalid | 10 |

Meanwhile, FIG. 3 illustrates a process of obtaining the pulse-shaped ternary code LUT resultant value 500 through the convolution operation of the ternary code input value 300 and the FIR filter coefficient values 400. The pulse-shaped ternary code LUT resultant value 500 is stored in advance in the LUT memory of the FIR filter at the stage of designing the transmitter, and accordingly, a high-speed parallel data process can be performed. In more detail, the pulse-shaped ternary LUT resultant value 500 is obtained by Equation (1).

$$g = \sum_{m=0}^{N-1} c_{N-1-m} w_m \quad (1)$$

Here, $c_{N-1-m}$ denotes the ternary code input value, $w_m$ the FIR filter coefficient value, N the size of the FIR filter used in the transmitter side, and g the pulse-shaped ternary LUT resultant value previously stored in the LUT memory when the transmitter is designed, respectively. For the convenience in explanation, it is assumed that k=1 in Equation (1).

The LUT resultant value obtained by Equation as above, for example, may be stored as respective values $g_1$ and $g_2$ in two LUT memories in consideration of the currently commercialized FPGA and the chip size as follows.

$$g_1 = \sum_{m=0}^{N/2-1} c_{N-1-m} w_m$$

$$g_2 = \sum_{m=N/2}^{N-1} c_{N-t-m} w_m$$

Table 3 below indicates a method of accessing a LUT memory using the ternary code input values in order to acquire the resultant values previously stored in the LUT memory. In Table 3, "address *" is expressed by a hexadecimal system, and "0x00~0x0c" correspond to decimal numbers "0~12". Additionally, in "$d_{ij}$**", "i" denotes an LUT memory address, and "j" denotes a phase. Accordingly, "dij" indicates the resultant value of convolution of a one-word size that corresponds to the j-th phase located in the i-th LUT memory address. Here, the word becomes different in accordance with the used DAC, and in the case of using a 6-bit DAC, one word refers to 6 bits.

UWB modem transmitter designed as above. As illustrated in FIG. 5, the internal operation clock used to obtain the pulse-shaped ternary code LUT values is a symbol clock 5305. Data values are searched and obtained by phases with reference to the LUT memory values 5321 to 5324 previously calculated and stored in the manner as described above with reference to FIG. 3 using the 6-bit data corresponding to upper three chips H2, M2 and L2 among the input values 5310 transferred from the ternary spreading code buffer 5220 of FIG. 2 as the LUT memory address values. Simultaneously, the previously calculated and stored LUT memory values 5331 to 5343 are searched and obtained by phases using the 6-bit data corresponding to lower three chips H, M and L as the LUT memory address values. The two values obtained by phases are added together by adders 5340 to 5343 to calculate and transfer the final pulse-shaped ternary code values 5350 to 5353 to the DAC block 6000.

FIG. 6 is a functional block diagram illustrating the construction of another FIR filter in the conventional DS-CDMA UWB modem transmitter designed as above. As illustrated in FIG. 6, the internal operation clock used to obtain the pulse-shaped ternary code LUT values is a clock 5405 the speed of which is twice the speed of the symbol clock 5305. The construction of FIG. 6 can be adopted only in the case that the coefficients of the FIR filter 5000 have a symmetric form on

TABLE 3

| Ternary code | | | Corresponding bits | Address * of LUT | Phase 0 (WRW0) | Phase 1 (WRW1) | Phase 2 (WRW2) | Phase 3 (WRW3) | two's complement |
|---|---|---|---|---|---|---|---|---|---|
| H2 | M2 | L2 | | | | | | | |
| 0 | 0 | 0 | 000000 | NON | 0 | 0 | 0 | 0 | |
| 0 | 0 | 1 | 000001 | 0x00 | $d_{30}$** | $d_{01}$ | $d_{02}$ | $d_{03}$ | No |
| 0 | 0 | -1 | 000010 | | | | | | Yes |
| 0 | 1 | 0 | 000100 | 0x01 | $d_{10}$ | $d_{11}$ | $d_{12}$ | $d_{13}$ | No |
| 0 | -1 | 0 | 001100 | | | | | | Yes |
| 0 | 1 | 1 | 000101 | 0x02 | $d_{20}$ | $d_{21}$ | $d_{22}$ | $d_{23}$ | No |
| 0 | -1 | -1 | 001111 | | | | | | Yes |
| 0 | 1 | -1 | 000111 | 0x03 | $d_{30}$ | $d_{31}$ | $d_{32}$ | $d_{33}$ | No |
| 0 | -1 | 1 | 001101 | | | | | | Yes |
| 1 | 0 | 0 | 010000 | 0x04 | $d_{40}$ | $d_{41}$ | $d_{42}$ | $d_{43}$ | No |
| -1 | 0 | 0 | 110000 | | | | | | Yes |
| 1 | 0 | 1 | 010001 | 0x05 | $d_{50}$ | $d_{51}$ | $d_{52}$ | $d_{53}$ | No |
| -1 | 0 | -1 | 110011 | | | | | | Yes |
| 1 | 0 | -1 | 010011 | 0x06 | $d_{60}$ | $d_{61}$ | $d_{62}$ | $d_{63}$ | No |
| -1 | 0 | 1 | 110001 | | | | | | Yes |
| 1 | 1 | 0 | 010100 | 0x07 | $d_{70}$ | $d_{71}$ | $d_{72}$ | $d_{73}$ | No |
| -1 | -1 | 0 | 111100 | | | | | | Yes |
| 1 | 1 | 1 | 010101 | 0x08 | $d_{80}$ | $d_{81}$ | $d_{82}$ | $d_{83}$ | No |
| -1 | -1 | -1 | 111111 | | | | | | Yes |
| 1 | 1 | -1 | 010111 | 0x09 | $d_{90}$ | $d_{91}$ | $d_{92}$ | $d_{93}$ | No |
| -1 | -1 | 1 | 111101 | | | | | | Yes |
| 1 | -1 | 0 | 011100 | 0x0a | $d_{a0}$ | $d_{a1}$ | $d_{a2}$ | $d_{a3}$ | No |
| -1 | 1 | 0 | 110100 | | | | | | Yes |
| 1 | -1 | 1 | 011101 | 0x0b | $d_{b0}$ | $d_{b1}$ | $d_{b2}$ | $d_{b3}$ | No |
| -1 | 1 | -1 | 110111 | | | | | | Yes |
| 1 | -1 | -1 | 011111 | 0x0c | $d_{c0}$ | $d_{c1}$ | $d_{c2}$ | $d_{c3}$ | No |
| -1 | 1 | 1 | 110101 | | | | | | Yes |

FIG. 4 shows an example of the FIR filter having filter coefficients that correspond to 6 symbol periods. Although the present invention is applicable to all cases using two or more taps, the FIR filter that has 24 taps and performs a 1:4 interpolation is illustrated FIG. 4 as an example. As shown in FIG. 4, in the case of performing the 1:4 interpolation, four phases 400 to 430 and 450 to 480 exist in one symbol. The term 'w(23)' indicates the earliest filter coefficient value, and 'w(00)' indicates the latest filter coefficient value.

FIG. 5 is a functional block diagram illustrating the construction of an FIR filter in the conventional DS-CDMA the basis of the center pulse. At the odd-numbered clocks 5440 to 5444 of the internal operation clock signal, data values are obtained by phases with reference to the LUT memory values 5421 to 5424 previously calculated and stored in the manner as described above with reference to FIG. 3 using the 6-bit data corresponding to the upper three chips H2, M2 and L2 among the input values 5410 transferred from the ternary spreading code buffer 5220 of FIG. 2 as the LUT memory address values, and the obtained values are stored in adders 5470 to 5473. Meanwhile, at the even-numbered clocks 5450 to 5454 of the internal operation clock signal, the lower three chips H, M and L are arrange in reverse order 5430, and then the LUT memory values 5421 to 5424 previously calculated and stored are obtained by phases using the 6-bit data corresponding to the lower three chips H, M and L. At the even-numbered clocks, the values obtained at the odd-numbered clocks and stored in the adders 5470 to 5473 and the resultant values obtained at the even-numbered clocks are added by phases by the adders 5470 to 5473 to calculate and transfer the final pulse-shaped ternary code values 5480 to 5483 to the DAC block 6000 of FIG. 1.

However, in designing the FIR filters in the conventional DS-CDMA UWB modem transmitter as illustrated in FIGS. 5 and 6, since all the input values of the ternary code are used as the address values, the unnecessary waste of memory occurs. In particular, since the construction of FIG. 6 requires an awfully large amount of memory for the LUT, the processing speed of the system becomes relatively slow, so that the FIR filter cannot correspond to the data transmission rate of the UWB modem currently proposed as the standard and cannot contribute to the adoption of the standardization.

SUMMARY OF THE INVENTION

Accordingly, the present invention is directed to an FIR filter of a DS-CDMA UWB modem transmitter and a control method thereof that substantially obviate one or more problems due to limitations and disadvantages of the related art.

It is an object of the present invention to provide an FIR filter of a DS-CDMA UWB modem transmitter and a control method thereof that can correspond to the data transmission rate of a UWB modem proposed in the present standardization and thus can contribute to the adoption of the standardization by designing the FIR filter having a low complexity and a high processing speed.

Additional advantages, objects, and features of the present invention will be set forth in part in the description which follows and in part will become apparent to those having ordinary skill in the art upon examination of the following or may be learned from practice of the present invention. The objectives and other advantages of the present invention may be realized and attained by the structure particularly pointed out in the written description and claims hereof as well as the appended drawings.

In order to achieve the above and other objects, there is provided an FIR (Finite Impulse Response) filter of a DS-CDMA (Direct Sequence Code Division Multiple Access) UWB (Ultra Wide-Band) modem transmitter having plural pairs of upper/lower LUTs (Look-Up Tables) in which pulse-shaped LUT resultant values are pre-stored and a plurality of adders for adding the upper/lower LUT resultant values, respectively, and using a symbol clock as an internal operation clock, according to the present invention, the FIR filter comprising an LUT control device for outputting a resultant value of "0" to all the adders if 6-bit input data values corresponding to upper three chips H2, M2 and L2 and 6-bit data values corresponding to lower three chips H, M and L among input data transferred from an upper side are "000000", while discriminating which group between a first group and a second group the upper/lower data values belong to if the upper/lower data values are not "000000", the LUT control device providing the upper or lower LUT values to the adders using the upper or lower LUT values as they are if the upper/lower data values belong to the first group, while converting the upper or lower LUT values into 2's complements and providing the converted values to the adders if the upper/lower data values belong to the second group.

In another aspect of the present invention, there is provided a control method for an FIR (Finite Impulse Response) filter of a DS-CDMA (Direct Sequence Code Division Multiple Access) UWB (Ultra Wide-Band) modem transmitter that has plural pairs of upper/lower LUTs (Look-Up Tables) in which pulse-shaped LUT resultant values are pre-stored, a plurality of adders for adding the upper/lower LUT resultant values, respectively, and an LUT control device, provided between the plurality of upper/lower LUTs and the plurality of adders, for controlling an acquisition and a path of the LUT resultant values, and that uses a symbol clock as an internal operation clock, the control method comprising an $11^{th}$ step of the LUT control device discriminating whether 6-bit input data values corresponding to upper three chips H2, M2 and L2 and lower three chips H, M and L among input data transferred from an upper side are "000000", a $12^{th}$ step of the LUT control device outputting a resultant value of "0" to all the adders if the data values are "000000", a $13^{th}$ step of the LUT control device selecting a corresponding switch if the upper/lower data values are certain values that are not "000000" a $14^{th}$ step of the LUT control device discriminating which group between a first group and a second group the upper/lower data values belong to, a $15^{th}$ step of the LUT control device providing the upper or lower LUT resultant values to the adders using the upper or lower LUT resultant values as they are if the upper/lower data values belong to the first group, and a $16^{th}$ step of the LUT control device converting the upper or lower LUT resultant values into 2's complements and providing the converted values to the adders if the upper/lower data values belong to the second group.

In another aspect of the present invention, there is provided a control method for an FIR (Finite Impulse Response) filter of a DS-CDMA (Direct Sequence Code Division Multiple Access) UWB (Ultra Wide-Band) modem transmitter that has plural pairs of upper/lower LUTs (Look-Up Tables) in which pulse-shaped LUT resultant values are pre-stored, a plurality of adders for adding the upper/lower LUT resultant values, respectively, and an LUT control device, provided between the plurality of upper/lower LUTs and the plurality of adders, for controlling an acquisition and a path of the LUT resultant values, and that uses a symbol clock as an internal operation clock, the control method comprising a first step of the LUT control device discriminating whether 6-bit input data values corresponding to upper three chips H2, M2 and L2 and lower three chips H, M and L among input data transferred from an upper side are "000000", a second step of the LUT control device outputting a resultant value of "0" to all the adders if the data values are "000000", a third step of the LUT control device selecting a corresponding switch if the upper/lower data values are certain values that are not "000000", a fourth step of the LUT control device discriminating which group between a first group and a second group the upper/lower data values belong to, a fifth step of the LUT control device providing the upper or lower LUT resultant values to the adders using the upper or lower LUT resultant values as they are if the upper/lower data values belong to the first group, and a sixth step of the LUT control device converting the upper or lower LUT resultant values into 2's complements and providing the converted values to the adders if the upper/lower data values belong to the second group.

In still another aspect of the present invention, there is provided a control method for an FIR (Finite Impulse Response) filter of a DS-CDMA (Direct Sequence Code Division Multiple Access) UWB (Ultra Wide-Band) modem transmitter that has a plurality of LUTs (Look-Up Tables) in which pulse-shaped LUT resultant values are pre-stored, a plurality of adders for adding the LUT resultant values obtained at odd-numbered clocks and the LUT resultant values obtained at even-numbered clocks, respectively, and an LUT control device, provided between the plurality of LUTs and the plurality of adders, for controlling an acquisition and a path of the LUT resultant values, and that uses a clock that is twice a symbol clock as an internal operation clock, the control method comprising an $21^{st}$ step of the LUT control device, at the odd-numbered clocks, discriminating whether 6-bit input data values corresponding to upper three chips H2, M2 and L2 among input data transferred from an upper side are "0000000", a $22^{nd}$ step of the LUT control device outputting a resultant value of "0" to all the adders if the input data values are "000000" at the $21^{st}$ step, a $23^{rd}$ step of the LUT control device selecting a corresponding switch if the upper data values are certain values that are not "000000" at the $21^{st}$ step, a $24^{th}$ step of the LUT control device discriminating which group between a first group and a second group the upper data values belong to, a $25^{th}$ step of the LUT control device providing the LUT resultant values to the adders using the LUT resultant values as they are if the upper data values belong to the first group at the $24^{th}$ step, and a $26^{th}$ step of the LUT control device converting the LUT resultant values into 2's complements and providing the converted values to the adders if the upper data values belong to the second group at the $24^{th}$ step.

In still another aspect of the present invention, there is provided a control method for an FIR (Finite Impulse Response) filter of a DS-CDMA (Direct Sequence Code Division Multiple Access) UWB (Ultra Wide-Band) modem transmitter that has a plurality of LUTs (Look-Up Tables) in which pulse-shaped LUT resultant values are pre-stored, a plurality of adders for adding the LUT resultant values obtained at odd-numbered clocks and the LUT resultant values obtained at even-numbered clocks, respectively, and an LUT control device, provided between the plurality of LUTs and the plurality of adders, for controlling an acquisition and a path of the LUT resultant values, and that uses a clock that is twice a symbol clock as an internal operation clock, the control method comprising an $31^{st}$ step of the LUT control device, at the even-numbered clocks, discriminating whether 6-bit input data values corresponding to lower three chips H, M and L among input data transferred from a lower side are "0000000", a $32^{nd}$ step of the LUT control device outputting a resultant value of "0" to all the adders if the input data values are "000000" at the $31^{st}$ step, a $33^{rd}$ step of the LUT control device selecting a corresponding switch if the lower data values are certain values that are not "000000" at the $31^{st}$ step, a $34^{th}$ step of the LUT control device discriminating which group between a first group and a second group the lower data values belong to, a $35^{th}$ step of the LUT control device providing the LUT resultant values to the adders using the LUT resultant values as they are if the lower data values belong to the first group at the $34^{th}$ step, and a $36^{th}$ step of the LUT control device converting the LUT resultant values into 2's complements and providing the converted values to the adders if the lower data values belong to the second group at the $34^{th}$ step.

It is to be understood that both the foregoing general description and the following detailed description of the present invention are exemplary and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

An FIR filter of a DS-CDMA UWB modem transmitter and a control method thereof according to preferred embodiments of the present invention will now be explained in detail with reference to the accompanying drawings.

Figure 7:
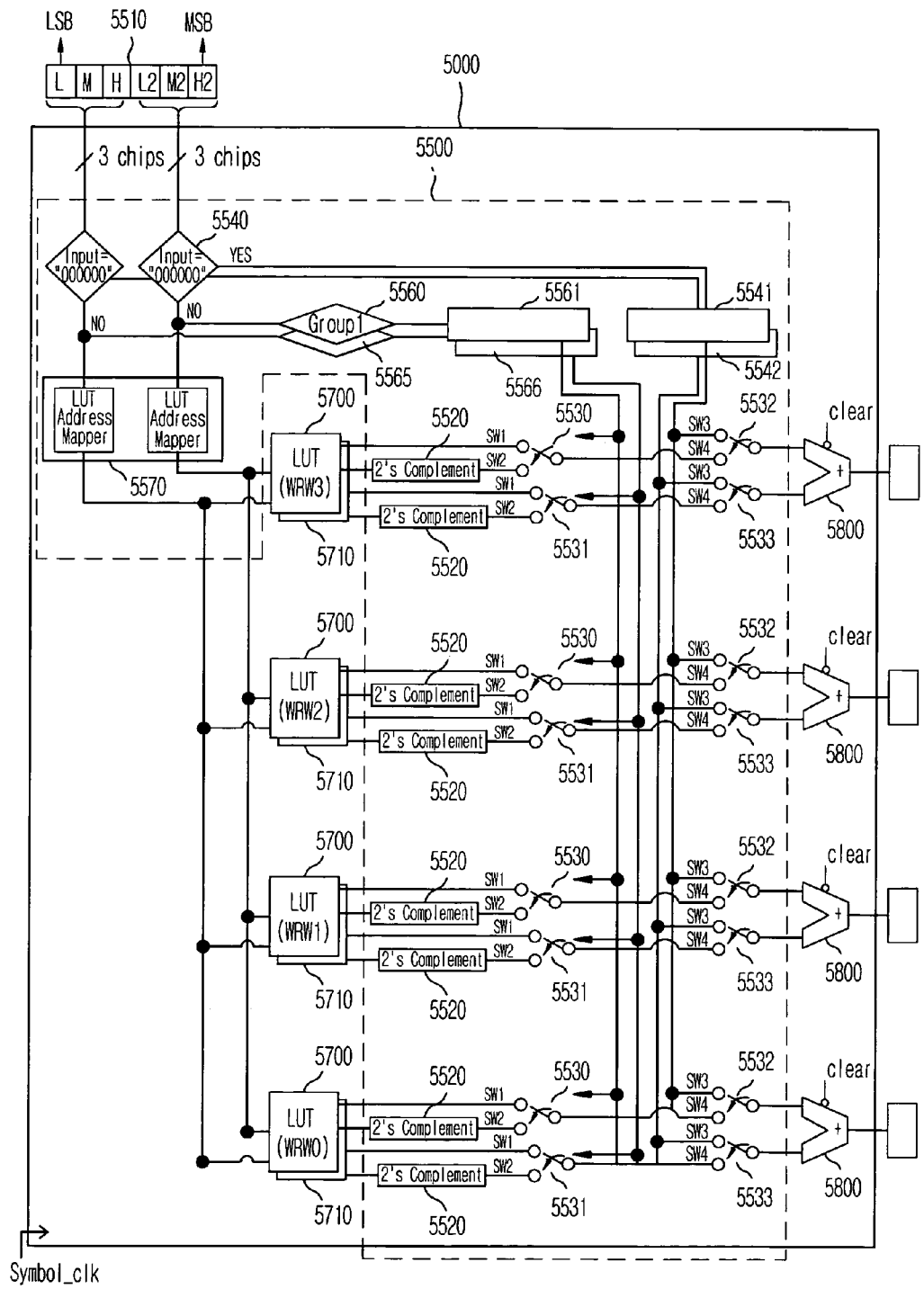
FIG. 7 is a block diagram illustrating the construction of an FIR filter of a DS-CDMA UWB modem transmitter according to an embodiment of the present invention.

FIG. 7 is a block diagram illustrating the construction of an FIR filter of a DS-CDMA UWB modem transmitter according to an embodiment of the present invention. The FIR filter of the DS-CDMA UWB modem transmitter according to an embodiment of the present invention includes an LUT control device 5500.

The LUT control device 5500 outputs a resultant value of "0" to all adders 5800 if 6-bit input data values corresponding to upper three chips H2, M2 and L2 or 6-bit data values corresponding to lower three chips H, M and L among input data 5510 transferred from an upper side are "000000", while it discriminates which group between a first group and a second group the upper/lower data values belong to if the upper/lower data values are not "000000". The LUT control device 5500 provides the upper or lower LUT values 5700 or 5710 to the adders 5800 using the upper or lower LUT values as they are if the upper/lower data values belong to the first group, while it converts the upper or lower LUT values 5700 or 5710 into 2's complements and provides the converted values to the adders 5800 if the upper/lower data values belong to the second group.

As illustrated in FIG. 7, the LUT control device 5500 includes a plurality of complement conversion units 5520, a plurality of first switches 5530, a plurality of second switches 5531, a plurality of third switches 5532, a plurality of fourth switches 5533, a first data discrimination unit 5540, a first switching control unit 5541, a second data discrimination unit 5560, a second switching control unit 5561, and an LUT address mapper 5570.

In this case, the plurality of complement conversion units 5520 of the LUT control device 5500 are connected to the upper and lower LUTs 5700 and 5710, respectively, and serve to convert output values of the upper/lower LUTs 5700 and 5710 into 2's complements.

Additionally, the plurality of first switches 5530 of the LUT control device 5500 are connected to the upper LUTs 5700 and output terminals of the complement conversion units 5520 that match the upper LUTs 5700, respectively. If the first switches 5530 switch over to their "$sw_1$" terminals under the control of the second switching control unit 5561, the first switches 5530 connect the corresponding upper LUTs 5700 to the corresponding adders 5800, respectively, while if the first switches 5530 switch over to their "$w_2$" terminals, the first switches 5530 connect the corresponding complement conversion units 5520 to the corresponding adders 5800, respectively.

The plurality of second switches 5531 of the LUT control device 5500 are connected to the lower LUTs 5710 and output terminals of the complement conversion units 5520 that match the lower LUTs 5710, respectively. If the second switches 5531 switch over to their "$sw_1$" terminals under the control of the second switching control unit 5566, the second switches 5531 connect the corresponding lower LUTs 5710 to the corresponding adders 5800, respectively, while if the second switches 5531 switch over to their "$sw_2$" terminals, the second switches 5531 connect the corresponding complement conversion units 5520 to the corresponding adders 5800, respectively.

The plurality of third switches 5532 of the LUT control device 5500 are connected between the first switches 5530 and the corresponding adders 5800, respectively. If the third switches 5532 switch over to their "$sw_4$" terminals under the control of the first switching control unit 5541, the third switches 5532 connect the corresponding first switches 5530 to the corresponding adders 5800, respectively, while if the third switches 5532 switch over to their "$sw_3$" terminals, the third switches 5532 disconnect the corresponding first switches 5530 from the corresponding adders 5800, respectively, and pass the resultant value of "0" to the corresponding adders 5800.

The plurality of fourth switches 5533 of the LUT control device 5500 are connected between the second switches 5531 and the corresponding adders 5800, respectively. If the fourth switches 5533 switch over to their "$sw_4$" terminals under the control of the first switching control unit 5542, the fourth switches 5533 connect the corresponding second switches 5531 to the corresponding adders 5800, respectively, while if the fourth switches 5533 switch over to their "$sw_3$" terminals, the fourth switches 5533 disconnect the corresponding second switches 5531 from the corresponding adders 5800, respectively, and pass the resultant value of "0" to the corresponding adders 5800.

Meanwhile, the first data discrimination unit 5540 of the LUT control device 5500 serves to discriminate whether the 6-bit data values corresponding to the upper three chips H2, M2 and L2 and the lower three chips H, M and L among the input data transferred from the upper side are "000000".

The first switching control units 5541 and 5542 of the LUT control device 5500, if it is discriminated that the data values corresponding to the upper three chips H2, M2 and L2 and the lower three chips H, M and L are "000000" (i.e., YES) through the first data discrimination unit 5540, control the third and fourth switches 5532 and 5533 to switch over to their "$sw_3$" terminals and to provide the resultant value of "0" to all the adders, respectively.

The second data discrimination unit 5560 of the LUT control device 5500 serves to discriminate whether the upper/lower data values belong to a first group or a second group if it is discriminated that the data values corresponding to the upper three chips H2, M2 and L2 and the lower three chips H, M and L are certain values other than "000000" (i.e., NO) through the first data discrimination unit 5540.

The second switching control units 5561 and 5566 of the LUT control device 5500, if it is discriminated that the data values corresponding to the upper three chips H2, M2 and L2 and the lower three chips H, M and L belong to the first group through the second data discrimination units 5560 and 5565, control the first and second switches 5530 and 5531 to switch over to their "$sw_1$" terminals and to connect the corresponding upper or lower LUTs 5700 or 5710 to the corresponding adders 5800, respectively. If it is discriminated that the data values belong to the second group, the second switching control units 5561 and 5566 control the first and second switches 5530 and 5531 to switch over to their "$sw_2$" terminals and to connect the corresponding complement conversion unit 5520 to the corresponding adders 5800, respectively.

Meanwhile, the LUT address mapper 5570 of the LUT control device 5500, if it is discriminated that the data values corresponding to the upper three chips H2, M2 and L2 and the lower three chips H, M and L are certain values other than "000000" (i.e., NO) through the first data discrimination unit 5540, calculates LUT memory values using the data values, and then performs a mapping of the calculated LUT memory values onto the corresponding LUTs 5700 and 5710 to provide the resultant values by phases of the corresponding upper/lower LUTs 5700 and 5710 to the corresponding adders 5800, respectively.

Figure 8:
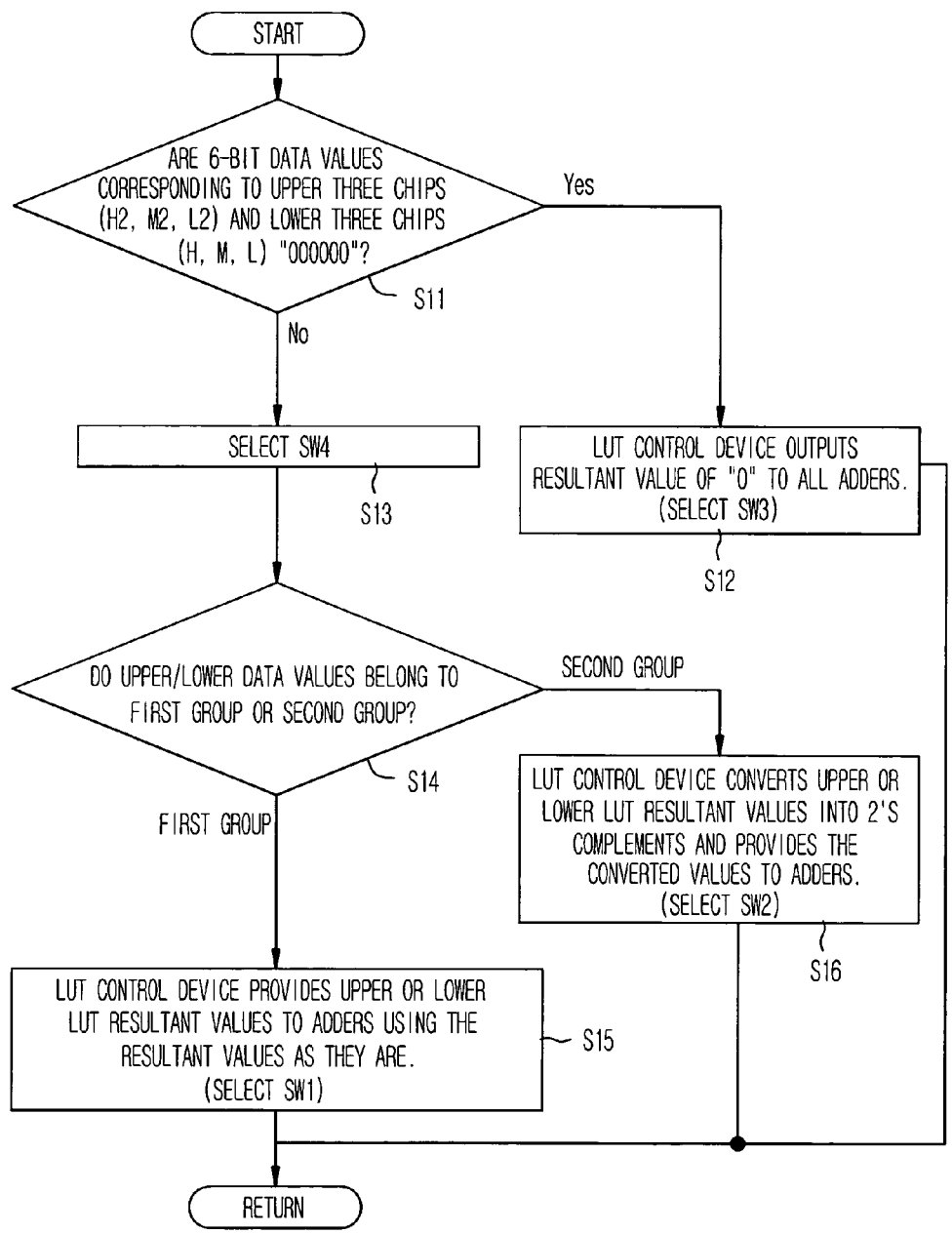
FIG. 8 is a flowchart illustrating a control method for the FIR filter of the DS-CDMA UWB modem transmitter of FIG. 7.

Now, the control method for the FIR filter of the DS-CDMA UWB modem transmitter as constructed above according to the present invention will be explained with reference to FIG. 8.

The LUT control device 5500 discriminates whether the 6-bit data values corresponding to the upper three chips H2, M2 and L2 and the lower three chips H, M and L among the input data transferred from the upper side are "000000" (step S11).

If the data values are "000000" (i.e., YES) at the $11^{th}$ step S11, the LUT control device 5500 selects a switch sw3 and outputs the resultant value of "0" to all the adders 5800 (step S12).

By contrast, if the data values are certain values other than "000000" (i.e., NO) at the $12^{th}$ step S12, the LUT control device 5500 selects a switch sw4 (step S13) and discriminates which group between the first group and the second group the upper/lower data values belong to (step S14).

If the upper/lower data values belong to the first group at the $14^{th}$ step S14, the LUT control device 5500 selects a switch sw1 and provides the upper/lower LUT resultant values to the adders 5800, respectively, using the upper/lower LUT resultant values as they are (step S15).

By contrast, if the upper/lower data values belong to the second group at the $14^{th}$ step S14, the LUT control device 5500 selects a switch sw2 and converts the upper/lower LUT resultant values into the 2's complements and provides the converted values to the adders 5800, respectively (step S16).

Meanwhile, the FIR filter of the DS-CDMA UWB modem transmitter and the control method thereof according to another embodiment of the present invention will be explained with reference to the accompanying drawings.

Figure 9:
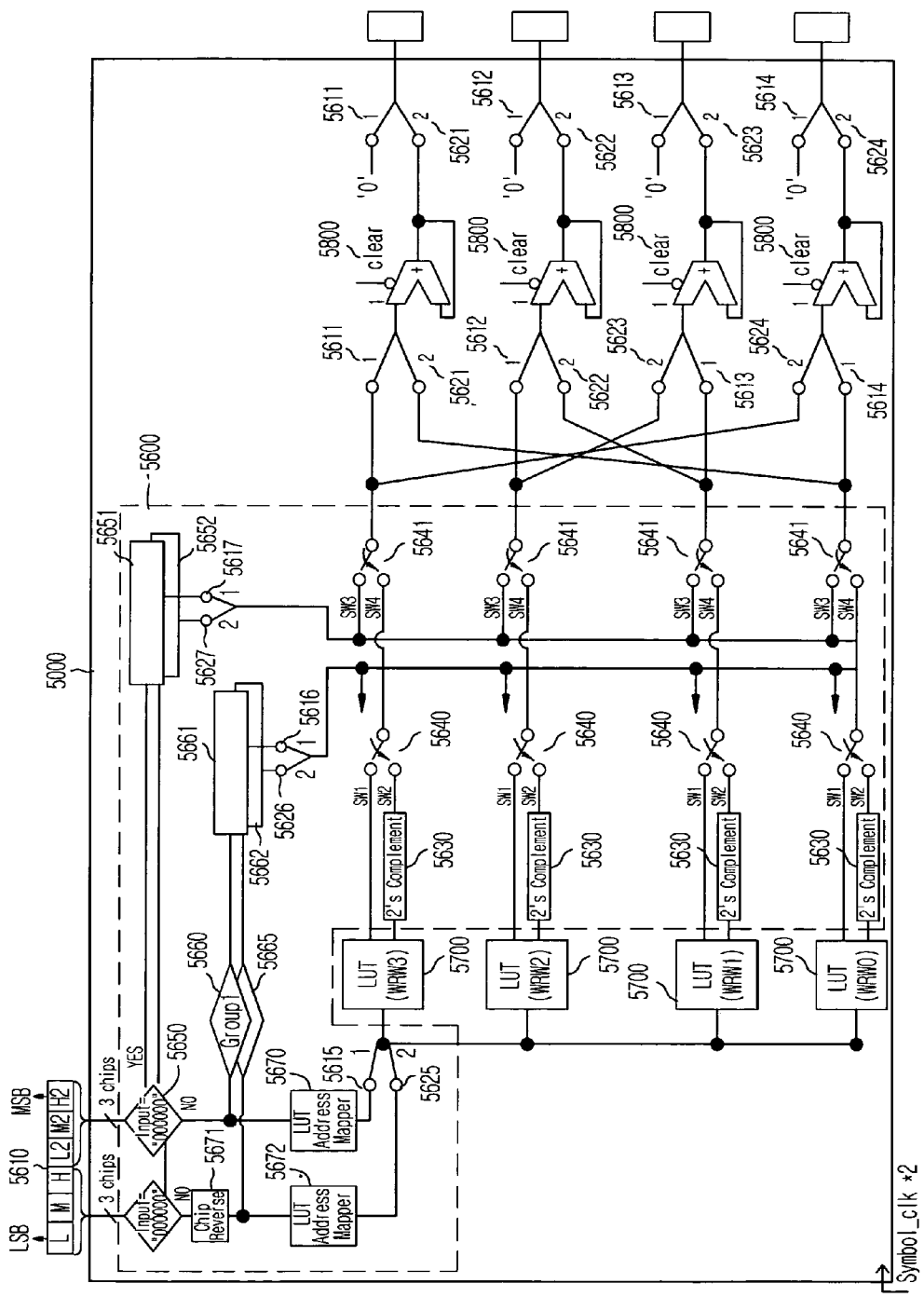
FIG. 9 is a block diagram illustrating the construction of an FIR filter of a DS-CDMA UWB modem transmitter according to another embodiment of the present invention.

FIG. 9 is a block diagram illustrating the construction of the FIR filter of the DS-CDMA UWB modem transmitter according to another embodiment of the present invention. The FIR filter of the DS-CDMA UWB modem transmitter according to an embodiment of the present invention includes an LUT control device 5600.

At the odd-numbered clocks 5611 to 5617, the LUT control device 5600 outputs the resultant value of "0" to all the adders 5800 if the 6-bit input data values corresponding to the upper three chips H2, M2 and L2 among the input data transferred from the upper side are "000000" (i.e., YES), while it discriminates which group between the first group and the second group the upper data values belong to if the upper data values are not "000000" (i.e., NO). If the upper data values belong to the first group, the LUT control device 5600 provides the LUT values 5700 to the adders 5800 using the LUT values 5700 as they are, while if the upper data values belong to the second group, it converts the LUT values into the 2's complements and provides the converted values to the adders 5800, respectively.

At the even-numbered clocks 5621 to 5627, the LUT control device 5600 outputs the resultant value of "0" to all the adders 5800 if the 6-bit input data values corresponding to the lower three chips H, M and L among the input data transferred from the lower side are "000000" (i.e., YES), while it discriminates which group between the first group and the second group the lower data values belong to if the lower data values are not "000000" (i.e., NO). If the lower data values belong to the first group, the LUT control device 5600 provides the LUT values 5700 to the adders a5800 using the LUT values 5700 as they are, while if the lower data values belong to the second group, it converts the LUT values 5700 into the 2's complements and provides the converted values to the adders 5800, respectively.

As illustrated in FIG. 9, the LUT control device 5600 includes a plurality of complement conversion units 5630, a plurality of first switches 5640, a plurality of second switches 5641, a first data discrimination unit 5650, first switching control units 5651 and 5652, a second data discrimination unit 5660, second switching control units 5661 and 5662, a first LUT address mapper 5670, a chip reverse unit 5671, and a second LUT address mapper 5672.

In this case, the plurality of complement conversion units 5630 of the LUT control device 5600 are connected to the plurality of LUTs 5700, respectively, and serve to convert output values of the respective LUTs 5700 into 2's complements.

Additionally, the plurality of first switches 5640 of the LUT control device 5600 are connected between the first switches 5640 and the corresponding adders 5800 and serve to connect the corresponding first switches 5640 to the corresponding adders 5800, or to disconnect the corresponding first switches 5640 from the corresponding adders 5800, respectively, to pass the resultant value of "0" to the corresponding adders 5800 under the control of the first switching control units 5651 and 5652.

Meanwhile, the first data discrimination unit 5650 of the LUT control device 5600 serves to discriminate whether the 6-bit data values corresponding to the upper three chips H2, M2 and L2 among the input data transferred from the upper side are "000000" at the odd-numbered clocks 5611 to 5617, while it serves to discriminate whether the 6-bit data values corresponding to the lower three chips H, M and L among the input data are "000000" at the even-numbered clocks 5621 to 5627.

The first switching control units 5651 and 5652 of the LUT control device 5600 control the second switches 5641 to switch over to their "sw₃" terminals and to provide the resultant value of "0" to all the adders 5800 if it is discriminated that the data values corresponding to the upper three chips H2, M2 and L2 are "000000" (i.e., YES) through the first data discrimination unit 5650 at the odd-numbered clocks 5611 to 5617, and if it is discriminated that the data values corresponding to the lower three chips H, M and L are "000000" (i.e., YES) through the first data discrimination unit 5650 at the even-numbered clocks 5621 to 5627, respectively.

The second data discrimination units 5660 and 5665 of the LUT control device 5600 serve to discriminate whether the upper/lower data values belong to the first group or the second group if it is discriminated that the data values corresponding to the upper three chips H2, M2 and L2 are certain values other than "000000" (i.e., NO) through the first data discrimination unit 5650 at the odd-numbered clocks 5611 to 5617, and if it is discriminated that the data values corresponding to the lower three chips H, M and L are certain values other than "000000" (i.e., NO) through the first data discrimination unit 5650 at the even-numbered clocks 5621 to 5627, respectively.

The second switching control units 5661 and 5662 of the LUT control device 5600, if it is discriminated that the data values corresponding to the upper three chips H2, M2 and L2 or the lower three chips H, M and L belong to the first group through the second data discrimination unit 5660, control the first switches 5640 to connect the corresponding LUTs 5700 to the corresponding adders 5800, while if it is discriminated that the data values belong to the second group, they control the first switches 5640 to connect the corresponding complement conversion unit 5630 to the corresponding adders 5800, respectively.

The first LUT address mapper 5670 of the LUT control device 5600, if it is discriminated that the data values corresponding to the upper three chips H2, M2 and L2 are certain values other than "000000" (i.e., NO) through the first data discrimination unit 5650 at the odd-numbered clocks 5611 to 5617, calculates the LUT memory values using the upper data values, and then performs a mapping of the calculated LUT memory values onto the corresponding LUTs 5700 to provide the resultant values by phases of the corresponding LUTs 5700 to the corresponding adders 5800, respectively.

The chip reverse unit 5671 of the LUT control device 5600, if it is discriminated that the data values corresponding to the lower three chips H, M and L are certain values other than "000000" (i.e., NO) through the first data discrimination unit 5650 at the even-numbered clocks 5621 to 5627, reverses the lower data values.

Meanwhile, the second LUT address mapper 5672 of the LUT control device 5600 serves to calculate the LUT memory values using the lower data values reversed by the chip reverse unit 5671 and then performs a mapping of the calculated LUT memory values onto the corresponding LUTs 5700, so that the resultant values by phases of the corresponding LUTs 5700 are provided to the corresponding adders 5800.

Figure 10:
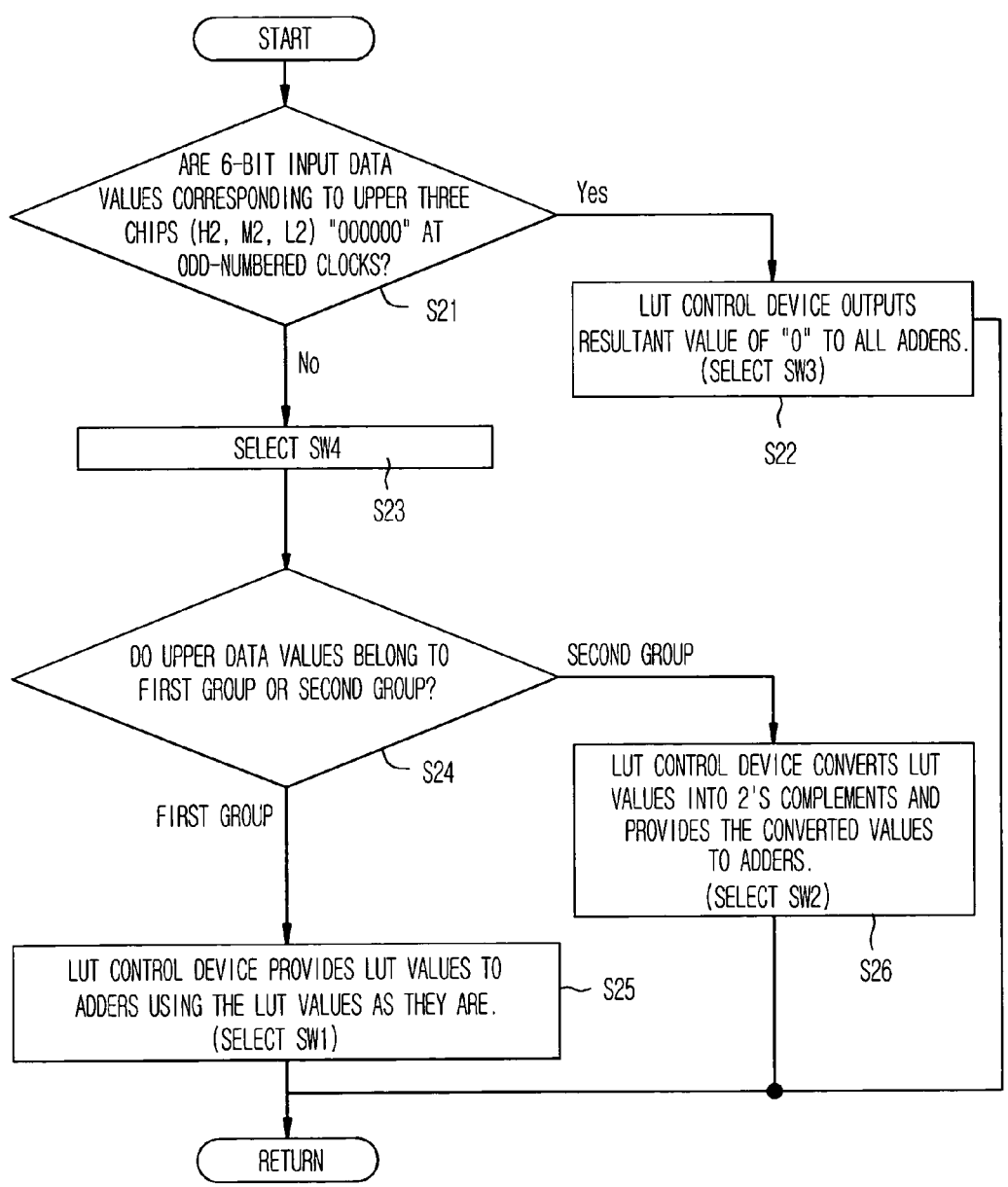
FIG. 10 is a flowchart illustrating a control method for the FIR filter of the DS-CDMA UWB modem transmitter of FIG. 9 at odd-numbered clocks.

Now, the control method for the FIR filter of the DS-CDMA UWB modem transmitter as constructed above according to another embodiment of the present invention will be explained. First, with reference to FIG. 10, the control method performed at the odd-numbered clocks 5611 to 5617 will be explained.

At the odd-numbered clocks 5611 to 5617, the LUT control device 5600 discriminates whether the 6-bit input data values corresponding to the upper three chips H2, M2 and L2 among the input data transferred from the upper side are "000000" (step S21).

If the input data values are "000000" (i.e., YES) at the 21$^{st}$ step S21, the LUT control device 5600 selects a switch sw3 and outputs the resultant value of "0" to all the adders 5800 (step S22).

By contrast, if the input data values are certain values other than "0000000" (i.e., NO) at the 21$^{st}$ step, the LUT control device 5600 selects a switch sw4 (step S23) and discriminates which group between the first group and the second group the upper data values belong to (step S24).

If the upper data values belong to the first group at the 24$^{th}$ step S24, the LUT control device 5600 selects a switch sw1 and provides the LUT values 5700 to the adders 5800 using the LUT values 5700 as they are (step S25).

By contrast, if the upper data values belong to the second group at the 24$^{th}$ step S24, the LUT control device 5600 selects a switch sw2 and converts the LUT values 5700 into the 2's complements and provides the converted values to the adders 5800, respectively (step S26).

Figure 11:
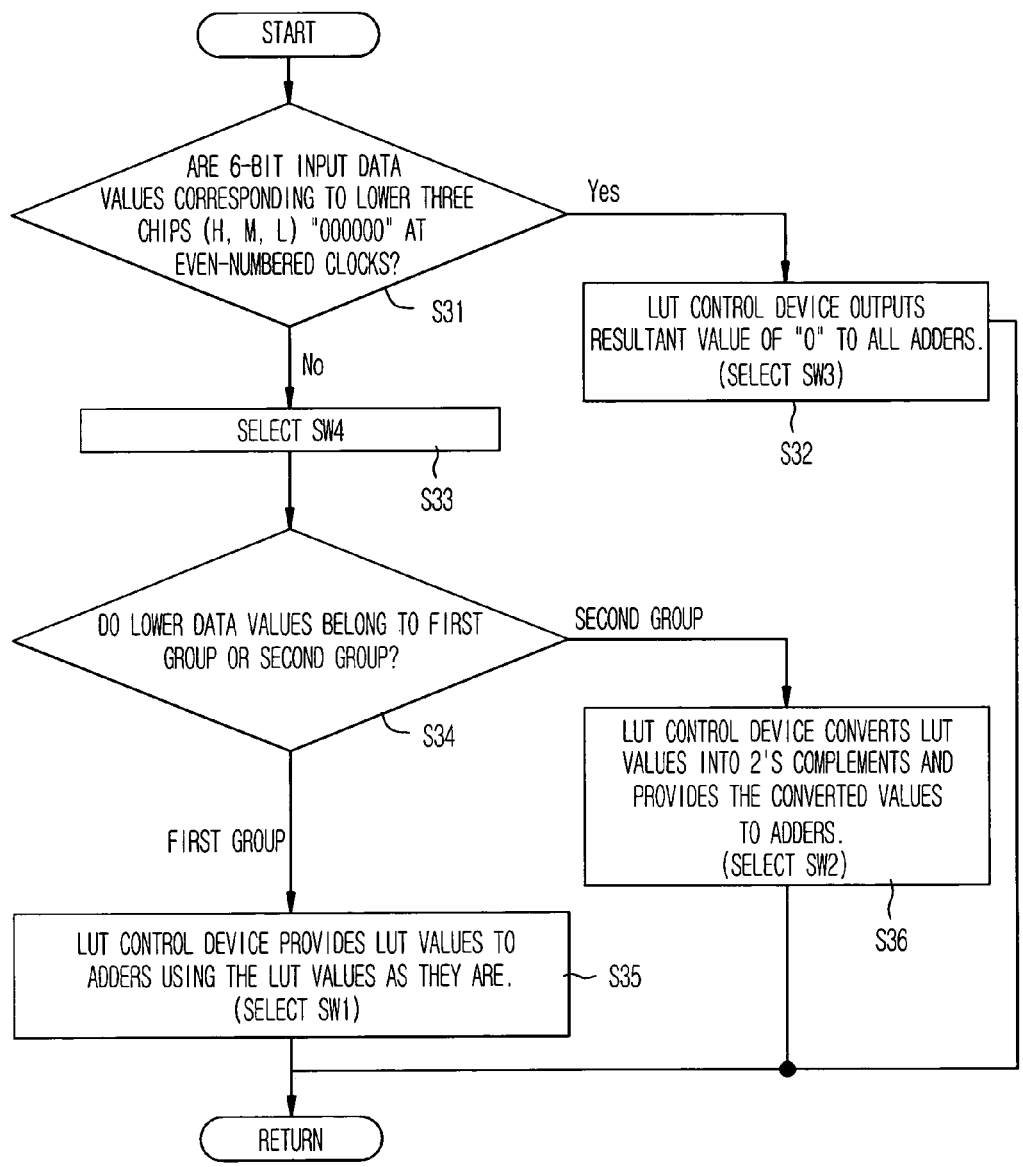
FIG. 11 is a flowchart illustrating a control method for the FIR filter of the DS-CDMA UWB modem transmitter of FIG. 9 at even-numbered clocks.

Second, the control method for the FIR filter of the DS-CDMA UWB modem transmitter at the even-numbered clocks 5621 to 5627 will be explained with reference to FIG. 11.

At the even-numbered clocks 5621 to 5627, the LUT control device 5600 discriminates whether the 6-bit input data values corresponding to the lower three chips H, M and L among the input data transferred from the lower side are "0000000" (step S31).

If the input data values are "0000000" (i.e., YES) at the 31$^{st}$ step S31, the LUT control device 5600 selects a switch sw3 and outputs the resultant value of "0" to all the adders 5800 (step S32).

By contrast, if the input data values are certain values other than "000000" (i.e., NO) at the 31$^{st}$ step, the LUT control device 5600 selects a switch sw4 (step S33) and discriminates which group between the first group and the second group the lower data values belong to (step S34).

If the lower data values belong to the first group at the 34$^{th}$ step S34, the LUT control device 5600 selects a switch sw1 and provides the LUT values 5700 to the adders 5800 using the LUT values 5700 as they are (step S35).

By contrast, if the lower data values belong to the second group at the 34$^{th}$ step S34, the LUT control device 5600 selects a switch sw2 and converts the LUT values 5700 into the 2's complements and provides the converted values to the adders 5800, respectively (step S36).

The control method for the FIR filter of the DS-CDMA UWB modem transmitter according to the embodiments of the present invention can be implemented by a computer program and stored in a recording medium such as a hard disc, floppy disc, optomagnetic disc, CD ROM, flash memory, ROM, RAM, etc.

TABLE 4

|  | Conventional Method I (FIG. 5) | Conventional Method II (FIG. 6) | Present Method I (FIG. 7) | Present Method II (FIG. 9) |
| --- | --- | --- | --- | --- |
| Size of Total LUT (word) | $L * k * 2 * 2^{N/k}$ | $L * k * 2^{N/k}$ | $L * k * 2 * \dfrac{3^{N/2k} - 1}{2}$ | $L * k * \dfrac{3^{N/2k} - 1}{2}$ |
| Operation Clock | Symbol Clock | 2 * Symbol Clock | Symbol Clock | 2* Symbol Clock |

Figure 1:
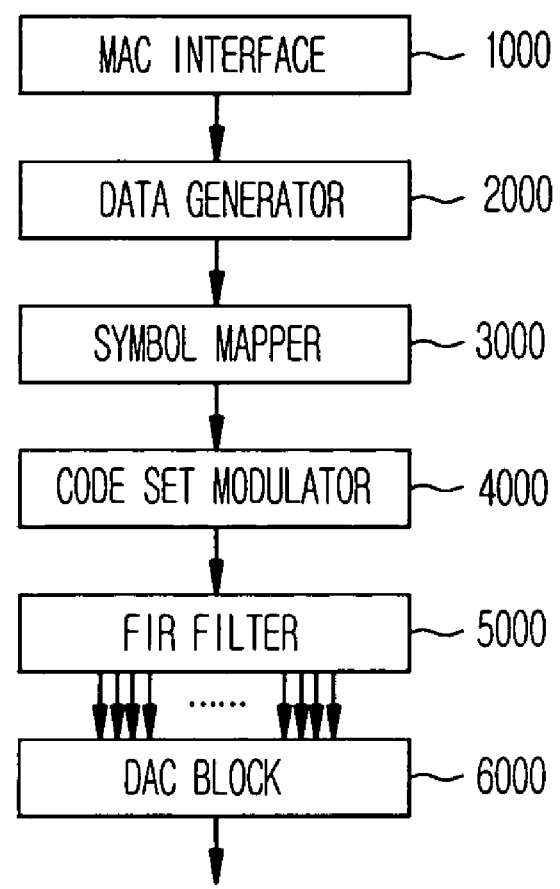
FIG. 1 is a block diagram illustrating the construction of a conventional DS-CDMA UWB modem transmitter.
Figure 2:
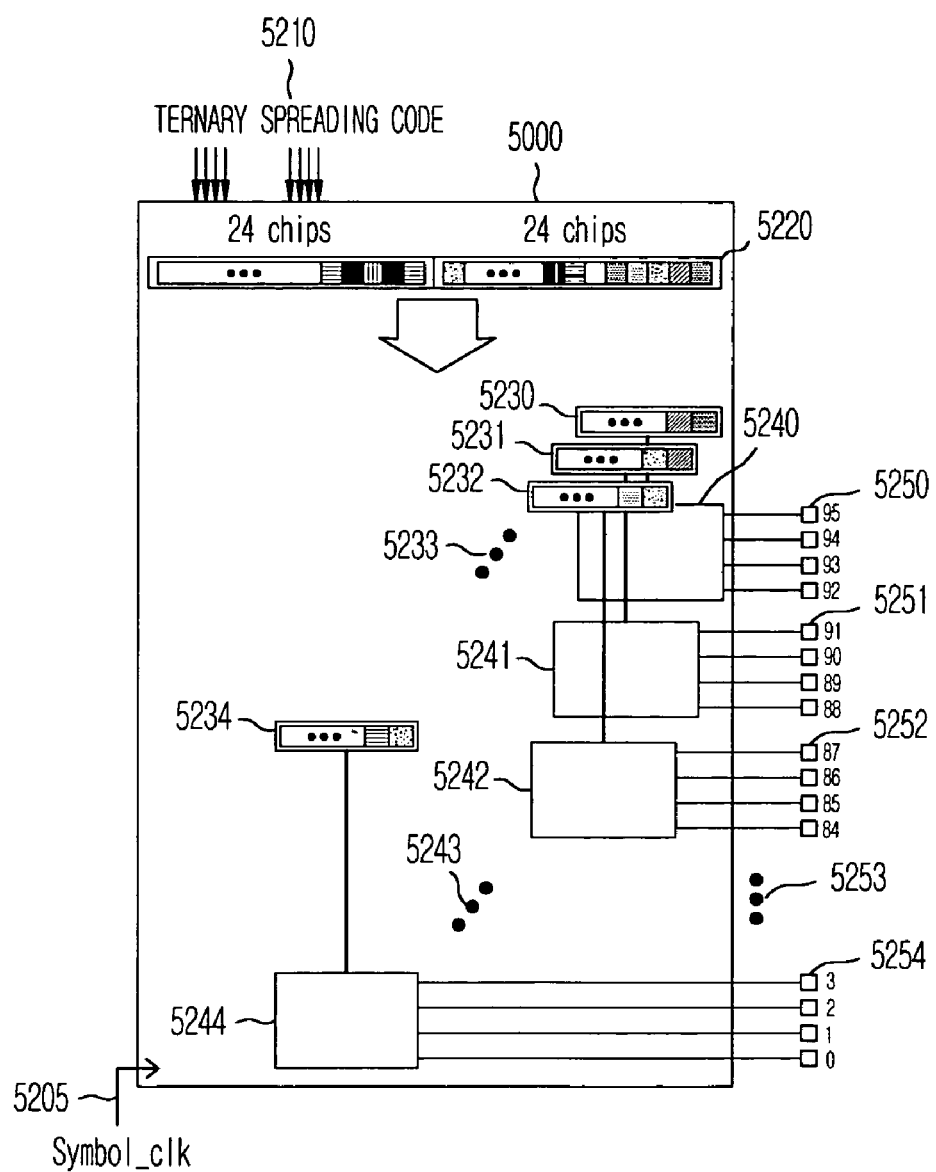
FIG. 2 is a block diagram illustrating an example of the 24-parallel processing structure of the FIR filter in the DS-CDMA UWB modem transmitter of FIG. 1.
Figure 3:
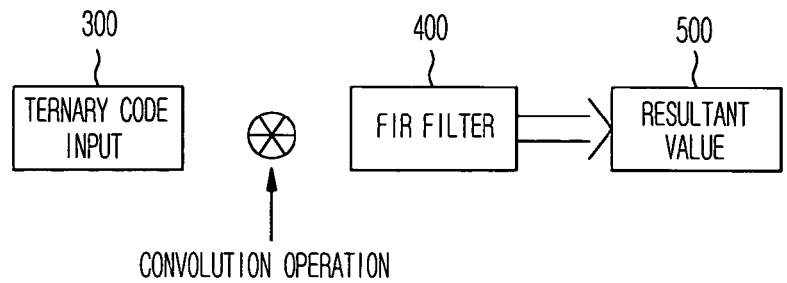
FIG. 3 illustrates a process of obtaining the pulse-shaped ternary code LUT resultant values through the convolution operation of the ternary code input values and the FIR filter coefficient values pre-stored in a LUT type memory when the DS-CDMA UWB modem transmitter of FIG. 1 is designed.
Figure 4:
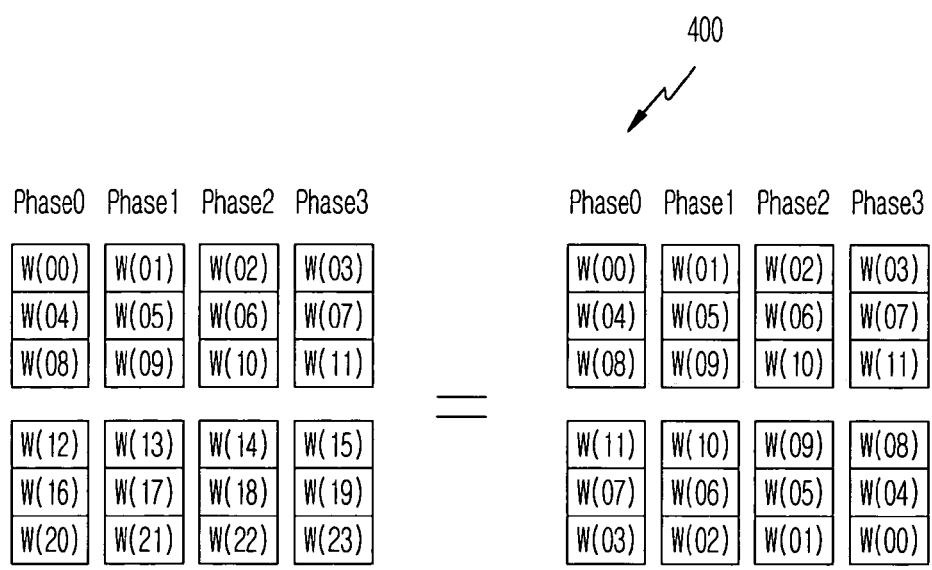
FIG. 4 is a view illustrating an example of 24-tap coefficient values (in the case of 24 taps and 1:4 interpolation) of the FIR filter of the DS-CDMA UWB modem transmitter of FIG. 1.
Figure 5:
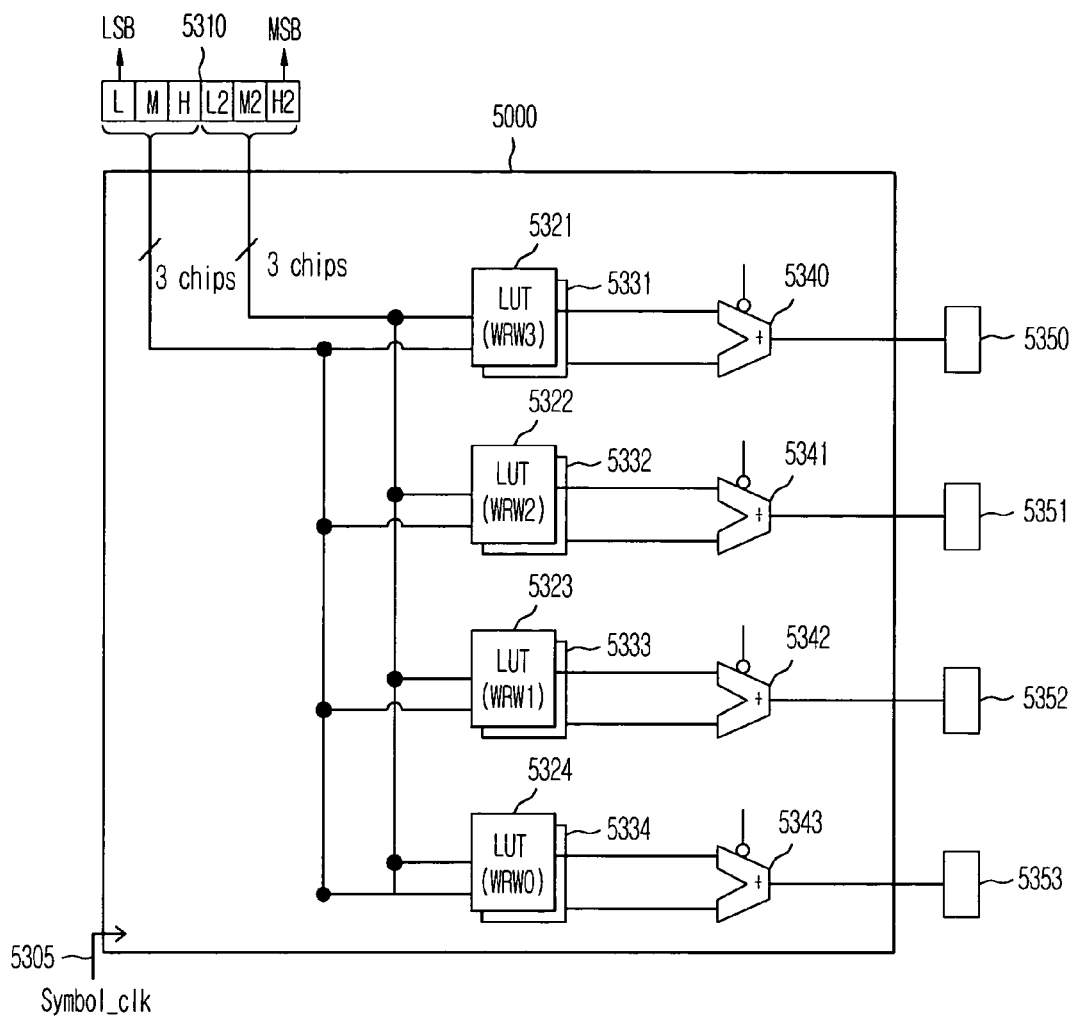
FIG. 5 is a block diagram illustrating the construction of an FIR filter in the conventional DS-CDMA UWB modem transmitter.
Figure 6:
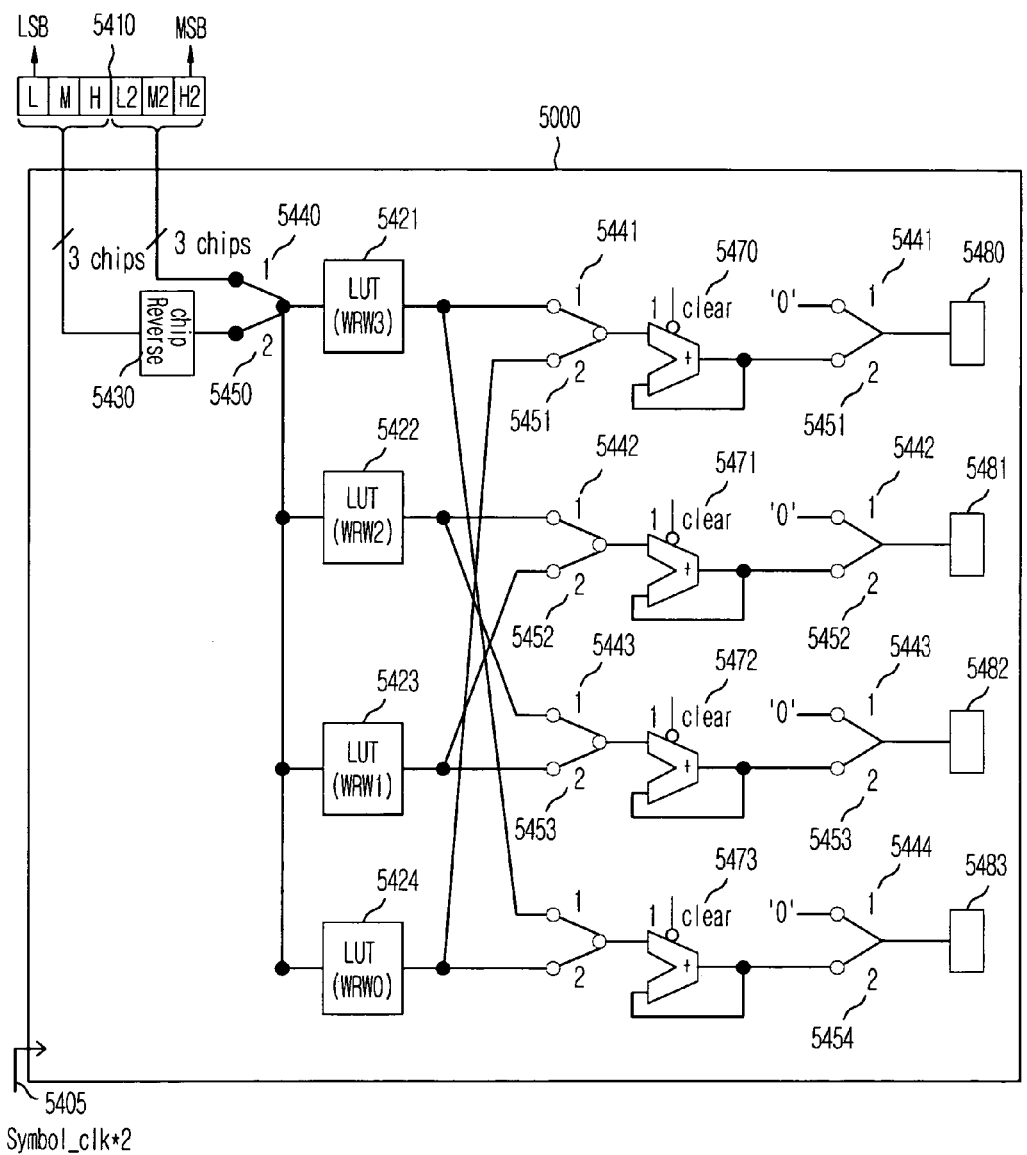
FIG. 6 is a block diagram illustrating the construction of another FIR filter in the conventional DS-CDMA UWB modem transmitter.

In Table 4, the LUT memory sizes of the FIR filter according to the present invention as illustrated in FIGS. 7 and 9 and those of the conventional FIR filter as illustrated in FIGS. 5 and 6 are described in a comparative manner. If L=24, k=4 and N=24, the total LUT memory size required for the transmitter using the conventional method I (of FIG. 5) corresponds to 12288 words, and that required for the present invention (of FIG. 7) corresponds to 2496 words. Accordingly, about 80% of the memory reduction can be achieved. Here, the term "word" is changed according to a DAC (Digital-to-Analog Converter) used in the transmitter, and in the case of using a 6-bit DAC, one word corresponds to 6 bits. Meanwhile, even in comparison to the conventional method II of FIG. 6 that uses the LUT address mappers instead of directly using the input values when referring to the LUT values, the present invention has the effect of reducing the amount of memory by more than 50%.

As described above, the FIR filter of the DS-CDMA UWB modem transmitter and the method thereof according to the present invention can reduce the amount of memory by about 50% to 80% in comparison to the conventional FIR filter. Additionally, since the FIR filter according to the present invention has a high processing speed and a low complexity, it properly corresponds to the data transmission rate of a UWB modem proposed in the present standardization and thus can contribute to the adoption of the standardization.

While the present invention has been described and illustrated herein with reference to the preferred embodiments thereof, it will be understood by those skilled in the art that various changes and modifications may be made to the invention without departing from the spirit and scope of the invention, which is defined in the appended claims.

What is claimed is:

1. An FIR (Finite Impulse Response) filter of a DS-CDMA (Direct Sequence Code Division Multiple Access) UWB (Ultra Wide-Band) modem transmitter, the FIR filter using a symbol clock as an internal operation clock and comprising:
    a pair of plural upper/lower LUTs (Look-Up Tables) in which pulse-shaped LUT resultant values are pre-stored;
    a plurality of adders for adding the upper/lower LUT resultant values, respectively, and
    an LUT control device for
        outputting a resultant value of "0" to all the adders if 6-bit input data values corresponding to upper three chips H2, M2 and L2 or 6-bit data values corresponding to lower three chips H, M and L among input data transferred from an upper side are "000000", while discriminating which group between a first group and a second group the upper/lower data values belong to if the upper/lower data values are not "000000", and providing the upper or lower LUT values to the adders using the upper or lower LUT values as they are if the upper/lower data values belong to the first group, while converting the upper or lower LUT values into 2's complements and providing the converted values to the adders if the upper/lower data values belong to the second group;

wherein the LUT control device comprises:

a plurality of complement conversion units, connected to the upper and lower LUTs, respectively, for converting the upper or lower LUT values outputted by the upper/lower LUTs into the 2's complements;

a plurality of first switches, connected to the upper LUTs and output terminals of the complement conversion units that match the upper LUTs, respectively, for switching paths of the respective output terminals;

a plurality of second switches, connected to the lower LUTs and the output terminals of the complement conversion units that match the lower LUTs, respectively, for switching paths of the respective output terminals;

a plurality of third switches, connected between the first switches and the corresponding adders, respectively, for connecting the corresponding first switches to the corresponding adders, respectively, or disconnecting the corresponding first switches from the corresponding adders, respectively, and passing the resultant value of "0" to the corresponding adders;

a plurality of fourth switches, connected between the second switches and the corresponding adders, respectively, for connecting the corresponding second switches to the corresponding adders, respectively, or disconnecting the corresponding second switches from the corresponding adders, respectively, and passing the resultant value of "0" to the corresponding adders;

a first data discrimination unit for discriminating whether the 6-bit data values corresponding to the upper three chips H2, M2 and L2 and the lower three chips H, M and L among the input data transferred from the upper side are "000000";

first switching control units for controlling the third and fourth switches to provide the resultant value of "0" to all the adders if the first data discrimination unit discriminates that the data values corresponding to the upper three chips H2, M2 and L2 and the lower three chips H, M and L are "000000";

a second data discrimination unit for discriminating whether the upper/lower data values belong to the first group or the second group if the first data discrimination unit discriminates that the data values corresponding to the upper three chips H2, M2 and L2 and the lower three chips H, M and L are certain values other than "000000";

second switching control units for connecting the corresponding upper or lower LUTs to the corresponding adders through the first and second switches, respectively, if the second data discrimination unit discriminates that the data values corresponding to the upper three chips H2, M2 and L2 or the lower three chips H, M and L belong to the first group, while connecting corresponding complement conversion units to the corresponding adders through the first and second switches, respectively, if the second data discrimination unit discriminates that the data values belong to the second group; and a LUT address mapper for calculating LUT memory values using the data values and then performing a mapping of the calculated LUT memory values onto the corresponding LUTs to provide the resultant values by phases of the corresponding upper/lower LUTs to the corresponding adders, respectively, if the first data discrimination unit discriminates that the data values corresponding to the upper three chips H2, M2 and L2 or the lower three chips H, M and L are certain values other than "000000".

2. The FIR filter as claimed in claim 1, wherein the FIR filter is applicable to all structures using a ternary spreading code having a length of $L \geq 1$.

3. The FIR filter as claimed in claim 1, wherein the FIR filter is applicable to all structures in which $k \geq 1$ and which use a 1:k-interpolation FIR filter.

4. A control method for an FIR (Finite Impulse Response) filter of a DS-CDMA (Direct Sequence Code Division Multiple Access) UWB (Ultra Wide-Band) modem transmitter, wherein the FIR filter uses a symbol clock as an internal operation clock and includes plural pairs of upper/lower LUTs (Look-Up Tables) in which pulse-shaped LUT resultant values are pre-stored, a plurality of adders for adding the upper/lower LUT resultant values, respectively, and an LUT control device, provided between the plurality of upper/lower LUTs and the plurality of adders, for controlling an acquisition and a path of the LUT resultant values, wherein the LUT control device comprises:

wherein the LUT control device comprises:

a plurality of complement conversion units, connected to the upper and lower LUTs, respectively, for converting the upper or lower LUT values outputted by the upper/lower LUTs into the 2's complements;

a plurality of first switches, connected to the upper LUTs and output terminals of the complement conversion units that match the upper LUTs, respectively, for switching paths of the respective output terminals;

a plurality of second switches, connected to the lower LUTs and the output terminals of the complement conversion units that match the lower LUTs, respectively, for switching paths of the respective output terminals;

a plurality of third switches, connected between the first switches and the corresponding adders, respectively, for connecting the corresponding first switches to the corresponding adders, respectively, or disconnecting the corresponding first switches from the corresponding adders, respectively, and passing the resultant value of "0" to the corresponding adders;

a plurality of fourth switches, connected between the second switches and the corresponding adders, respectively, for connecting the corresponding second switches to the corresponding adders, respectively, or disconnecting the corresponding second switches from the corresponding adders, respectively, and passing the resultant value of "0" to the corresponding adders;

a first data discrimination unit for discriminating whether the 6-bit data values corresponding to the upper three chips H2, M2 and L2 and the lower three chips H, M and L among the input data transferred from the upper side are "000000";

first switching control units for controlling the third and fourth switches to provide the resultant value of "0" to all the adders if the first data discrimination unit discriminates that the data values corresponding to the upper three chips H2, M2 and L2 and the lower three chips H, M and L are "000000";

a second data discrimination unit for discriminating whether the upper/lower data values belong to the first group or the second group if the first data discrimination unit discriminates that the data values corresponding to the upper three chips H2, M2 and L2 and the lower three chips H, M and L are certain values other than "000000";

second switching control units for connecting the corresponding upper or lower LUTs to the corresponding adders though the first and second switches, respectively, if the second data discrimination unit discriminates that the data values corresponding to the upper three chips H2, M2 and L2 or the lower three chips H, M and L belong to the first group, while connecting the corresponding complement conversion units to the corresponding adders through the first and second switches, respectively, if the second data discrimination unit discriminates that the data values belong to the second group; and a LUT address mapper for calculating LUT memory values using the data values and then performing a mapping of the calculated LUT memory values onto the corresponding LUTs to provide the resultant values by phases of the corresponding upper/lower LUTs to the corresponding adders, respectively, if the first data discrimination unit discriminates that the data values corresponding to the upper three chips H2, M2 and L2 or the lower three chips H, M and L are certain values other than "000000";

the control method comprising:

a first step in which the first data discrimination unit of the LUT control device discriminates whether 6-bit input data values corresponding to upper three chips H2, M2 and L2 and lower three chips H, M and L among input data transferred from an upper side are "000000";

a second step in which the first switching control units control the third switches of the LUT control device to provide a resultant value of "0" to all the adders if the first data discrimination unit discriminates that the upper/lower data values are "000000";

a third step in which the LUT control device selects a corresponding switch if the first data discrimination unit discriminates that the upper/lower data values are certain values other than "000000";

a fourth step in which the second data discrimination unit of the LUT control device discriminates which group between a first group and a second group the upper/lower data values belong to if the first data discrimination unit discriminates that the upper/lower data values are certain values other than "000000";

a fifth step in which the second switching control units of the LUT control device control the first and second switches to provide the upper or lower LUT resultant values as they are to the corresponding adders if the second data discrimination unit discriminates that the upper/lower data values belong to the first group; and a sixth step in which the corresponding complement conversion units of the LUT control device convert the upper or lower LUT resultant values into 2's complements and the second switching control units control the first and second switches to provide the converted values to the adders if the second data discrimination unit discriminates that the upper/lower data values belong to the second group; and a seventh step in which the LUT address mapper calculates LUT memory values using the data values and then performs a mapping of the calculated LUT memory values onto the corresponding LUTs to provide the resultant values by phases of the corresponding upper/lower LUTs to the corresponding adders, respectively, if the first data discrimination unit discriminates that the data values corresponding to the upper three chips H2, M2 and L2 or the lower three chips H, M and L are certain values other than "000000".

5. The control method as claimed in claim 4, wherein the control method is applicable to all structures using a ternary spreading code having a length of $L \geq 1$.

6. The control method as claimed in claim 4, wherein the control method is applicable to all structures in which $k \geq 1$ and which use a 1:k-interpolation FIR filter.

7. An FIR (Finite Impulse Response) filter of a DS-CDMA (Direct Sequence Code Division Multiple Access) UWB (Ultra Wide-Band) modem transmitter, the FIR filter using a clock that is twice a symbol clock as an internal operation clock and comprising:

a plurality of LUTs (Look-Up Tables) in which pulse-shaped LUT resultant values are pre-stored, a plurality of adders for adding the LUT resultant values obtained at odd-numbered clocks and the LUT resultant values obtained at even-numbered clocks, respectively, and an LUT control device for at the odd-numbered clocks, outputting a resultant value of "0" to all the adders if 6-bit input data values corresponding to upper three chips H2, M2 and L2 among input data transferred from an upper side are "000000", while discriminating which group between a first group and a second group the upper data values belong to if the upper data values are not "000000", and providing the upper LUT values to the adders using the upper LUT values as they are if the upper data values belong to the first group, while converting the upper LUT values into 2's complements and providing the converted values to the adders if the upper data values belong to the second group; and at the even-numbered clocks, outputting the resultant value of "0" to all the adders if 6-bit input data values corresponding to lower three chips H, M and L among the input data transferred from a lower side are "000000", while discriminating which group between the first group and the second group the lower data values belong to if the lower data values are not "000000", and providing the lower LUT values to the adders using the lower LUT values as they are if the lower data values belong to the first group, while converting the lower LUT values into 2's complements and providing the converted values to the adders if the lower data values belong to the second group;

wherein the LUT control device comprises:

a plurality of complement conversion units, connected to the LUTs, respectively, for converting the LUT values outputted by the respective LUTs into the 2's complements at the even-numbered clocks;

a plurality of first switches, connected to the LUTs and output terminals of the corresponding complement conversion units, respectively, for switching paths of the respective output terminals;

a plurality of second switches, connected between the first switches and the corresponding adders, respectively, for connecting the corresponding first switches to the corresponding adders, respectively, or disconnecting the corresponding first switches from the corresponding adders, respectively, and passing the resultant value of "0" to the corresponding adders;

a first data discrimination unit for discriminating whether the 6-bit data values corresponding to the upper three chips H2, M2 and L2 among the input data transferred from the upper side are "000000" at the odd-numbered clocks and for discriminating whether the 6-bit data values corresponding to the lower three chips H, M and L are "000000" at the even-numbered clocks;

first switching control units for controlling the second switches to provide the resultant value of "0" to all the adders if the first data discrimination unit discriminates that the data values corresponding to the upper three chips H2, M2 and L2 are "000000" at the odd-numbered clocks and that the data values corresponding to the lower three chips H, M and L are "000000" at the even-numbered clocks;

a second data discrimination unit for discriminating whether the upper/lower data values belong to the first group or the second group if the first data discrimination unit discriminates that the data values corresponding to the upper three chips H2, M2 and L2 are certain values other than "000000" at the odd-numbered clocks and that the data values corresponding to the lower three chips H, M and L are certain values other than "000000" at the even-numbered clock;

second switching control units for connecting the corresponding LUTs to the corresponding adders though the first switches, respectively, if the second data discrimination unit discriminates that the data values corresponding to the upper three chips H2, M2 and L2 or the lower three chips H, M and L belong to the first group, while connecting the corresponding complement conversion units to the corresponding adders through the first switches, respectively, if the second data discrimination unit discriminates that the data values belong to the second group;

a first LUT address mapper for calculating LUT memory values using the upper data values and then performing a mapping of the calculated LUT memory values onto the corresponding LUTs to provide the resultant values by phases of the corresponding LUTs to the corresponding adders, respectively, the first data discrimination unit discriminates that the data values corresponding to the upper three chips H2, M2 and L2 are certain values other than "000000" at the odd-numbered clocks;

a chip reverse unit for reversing the lower data values if the first data discrimination unit discriminates that the data values corresponding to the lower three chips H, M and L are certain values other than "000000" at the even-numbered clocks; and a second LUT address mapper for calculating the LUT memory values using the lower data values reversed by the chip reverse unit and then performing a mapping of the calculated LUT memory values onto the corresponding LUTs to provide the resultant values by phases of the corresponding LUTs to the corresponding adders, respectively.

8. The FIR filter as claimed in claim 7, wherein the FIR filter is applicable to all structures using a ternary spreading code having a length of $L \geq 1$.

9. The FIR filter as claimed in claim 7, wherein the FIR filter is applicable to all structures in which $k \geq 1$ and which use a 1:k-interpolation FIR filter.

10. A control method for an FIR (Finite Impulse Response) filter of a DS-CDMA (Direct Sequence Code Division Multiple Access) UWB (Ultra Wide-Band) modem transmitter, wherein the FIR filter uses a clock that is twice a symbol clock as an internal operation clock and includes:
a plurality of LUTs (Look-Up Tables) in which pulse-shaped LUT resultant values are pre-stored,
a plurality of adders for adding the LUT resultant values obtained at odd-numbered clocks and the LUT resultant values obtained at even-numbered clocks, respectively, and
an LUT control device, provided between the plurality of LUTs and the plurality of adders, for controlling an acquisition and a path of the LUT resultant values, wherein the LUT control device comprises:
wherein the LUT control device comprises:
a plurality of complement conversion units, connected to the LUTs, respectively, for converting the LUT values outputted by the respective LUTs into the 2's complements at the even-numbered clocks;
a plurality of first switches, connected to the LUTs and output terminals of the corresponding complement conversion units, respectively, for switching paths of the respective output terminals;
a plurality of second switches, connected between the first switches and the corresponding adders, respectively, for connecting the corresponding first switches to the corresponding adders, respectively, or disconnecting the corresponding first switches from the corresponding adders, respectively, and passing the resultant value of "0" to the corresponding adders;
a first data discrimination unit for discriminating whether the 6-bit data values corresponding to the upper three chips H2, M2 and L2 among the input data transferred from the upper side are "000000" at the odd-numbered clocks and for discriminating whether the 6-bit data values corresponding to the lower three chips H, M and L are "000000" at the even-numbered clocks;
first switching control units for controlling the second switches to provide the resultant value of "0" to all the adders if the first data discrimination unit discriminates that the data values corresponding to the upper three chips H2, M2 and L2 are "000000" at the odd-numbered clocks and that the data values corresponding to the lower three chips H, M and L are "000000" at the even-numbered clocks;
a second data discrimination unit for discriminating whether the upper/lower data values belong to the first group or the second group if the first data discrimination unit discriminates that the data values corresponding to the upper three chips H2, M2 and L2 are certain values other than "000000" at the odd-numbered clocks and that the data values corresponding to the lower three chips H, M and L are certain values other than "000000" at the even-numbered clock;
second switching control units for connecting the corresponding LUTs to the corresponding adders though the first switches, respectively, if the second data discrimination unit discriminates that the data values corresponding to the upper three chips H2, M2 and L2 or the lower three chips H, M and L belong to the first group, while connecting the corresponding complement conversion units to the corresponding adders though the first switches, respectively, if the second data discrimination unit discriminates that the data values belong to the second group;

a first LUT address mapper for calculating LUT memory values using the upper data values and then performing a mapping of the calculated LUT memory values onto the corresponding LUTs to provide the resultant values by phases of the corresponding LUTs to the corresponding adders, respectively, if the first data discrimination unit discriminates that the data values corresponding to the upper three chips H2, M2 and L2 are certain values other than "000000" at the odd-numbered clocks;

a chip reverse unit for reversing the lower data values if the first data discrimination unit discriminates that the data values corresponding to the lower three chips H, M and L are certain values other than "000000" at the even-numbered clocks; and a second LUT address mapper for calculating the LUT memory values using the lower data values reversed by the chip reverse unit and then performing a mapping of the calculated LUT memory values onto the corresponding LUTs to provide the resultant values by phases of the corresponding LUTs to the corresponding adders, respectively;

the control method comprising:

a first step in which the first data discrimination unit of the LUT control device, at the odd-numbered clocks, discriminates whether 6-bit input data values corresponding to upper three chips H2, M2 and L2 among input data transferred from an upper side are "000000";

a second step in which the first switching control units control the second switches of the LUT control device to provide a resultant value of "0" to all the adders if the first data discrimination unit discriminates that the input data values are "000000" at the first step;

a third step in which the LUT control device selects a corresponding switch if the first data discrimination unit discriminates that the upper data values are certain values other than "000000" at the first step;

a fourth step in which the second data discrimination unit of the LUT control device discriminates which group between a first group and a second group the upper data values belong to if the first data discrimination unit discriminates that the upper data values are certain values other than "000000";

a fifth step in which the second switching control units of the LUT control device provide the LUT resultant values as they are to the adders through the first switches, respectively, if the second data discrimination unit discriminates that the upper data values belong to the first group at the fourth step;

a sixth step in which the complement conversion units of the LUT control device convert the LUT resultant values into 2's complements and the second switching control units provide the converted values to the adders through the first switches, respectively, if the second data discrimination unit discriminates that the upper data values belong to the second group at the fourth step; and a seventh step in which the first LUT address mapper calculates LUT memory values using the upper data values and then performs a mapping of the calculated LUT memory values onto the corresponding LUTs to provide the resultant values by phases of the corresponding LUTs to the corresponding adders, respectively, if the first data discrimination unit discriminates that the data values corresponding to the upper three chips H2, M2 and L2 are certain values other than "000000" at the odd-numbered clocks.

11. The control method as claimed in claim 10, wherein the control method is applicable to all structures using a ternary spreading code having a length of L≧1.

12. The control method as claimed in claim 10, wherein the control method is applicable to all structures in which k≧1 and which use a 1:k-interpolation FIR filter.

13. A control method for an FIR (Finite Impulse Response) filter of a DS-CDMA (Direct Sequence Code Division Multiple Access) UWB (Ultra Wide-Band) modem transmitter, wherein the FIR filter uses a clock that is twice a symbol clock as an internal operation clock and includes;
a plurality of LUTs (Look-Up Tables) in which pulse-shaped LUT resultant values are pre-stored,
a plurality of adders for adding the LUT resultant values obtained at odd-numbered clocks and the LUT resultant values obtained at even-numbered clocks, respectively, and
an LUT control device, provided between the plurality of LUTs and the plurality of adders, for controlling an acquisition and a path of the LUT resultant values,
wherein the LUT control device comprises:
wherein the LUT control device comprises:
a plurality of complement conversion units, connected to the LUTs, respectively, for converting the LUT values outputted by the respective LUTs into the 2's complements at the even-numbered clocks;
a plurality of first switches, connected to the LUTs and output terminals of the corresponding complement conversion units, respectively, for switching paths of the respective output terminals;
a plurality of second switches, connected between the first switches and the corresponding adders, respectively, for connecting the corresponding first switches to the corresponding adders, respectively, or disconnecting the corresponding first switches from the corresponding adders, respectively, and passing the resultant value of "0" to the corresponding adders;
a first data discrimination unit for discriminating whether the 6-bit data values corresponding to the upper three chips H2, M2 and L2 among the input data transferred from the upper side are "000000" at the odd-numbered clocks and for discriminating whether the 6-bit data values corresponding to the lower three chips H, M and L are "000000" at the even-numbered clocks;
first switching control units for controlling the second switches to provide the resultant value of "0" to all the adders if the first data discrimination unit discriminates that the data values corresponding to the upper three chips H2, M2 and L2 are "000000" at the odd-numbered clocks and that the data values corresponding to the lower three chips H, M and L are "000000" at the even-numbered clocks;
a second data discrimination unit for discriminating whether the upper/lower data values belong to the first group or the second group if the first data discrimination unit discriminates that the data values corresponding to the upper three chips H2, M2 and L2 are certain values other than "000000" at the odd-numbered clocks and that the data values corresponding to the lower three chips H, M and L are certain values other than "000000" at the even-numbered clock;

second switching control units for connecting the corresponding LUTs to the corresponding adders though the first switches, respectively, if the second data discrimination unit discriminates that the data values corresponding to the upper three chips H2, M2 and L2 or the lower three chips H, M and L belong to the first group, while connecting the corresponding complement conversion units to the corresponding adders though the first switches, respectively, if the second data discrimination unit discriminates that the data values belong to the second group;

a first LUT address mapper for calculating LUT memory values using the upper data values and then performing a mapping of the calculated LUT memory values onto the corresponding LUTs to provide the resultant values by phases of the corresponding LUTs to the corresponding adders, respectively, if the first data discrimination unit discriminates that the data values corresponding to the upper three chips H2, M2 and L2 are certain values other than "000000" at the odd-numbered clocks;

a chip reverse unit for reversing the lower data values if the first data discrimination unit discriminates that the data values corresponding to the lower three chips H, M and L are certain values other than "000000" at the even-numbered clocks; and a second LUT address mapper for calculating the LUT memory values using the lower data values reversed by the chip reverse unit and then performing a mapping of the calculated LUT memory values onto the corresponding LUTs to provide the resultant values by phases of the corresponding LUTs to the corresponding adders, respectively;

the control method comprising:

a first step in which the first data discrimination unit of the LUT control device, at the even-numbered clocks, discriminates whether 6-bit input data values corresponding to lower three chips H, M and L among input data transferred from a lower side are "000000";

a second step in which the first switching control units control the second switches of the LUT control device to provide a resultant value of "0" to all the adders if the first data discrimination unit discriminates that the input data values are "000000" at the first step;

a third step in which the LUT control device selects a corresponding switch if the first data discrimination unit discriminates that the lower data values are certain values other than "000000" at the first step;

a fourth step in which the second data discrimination unit of the LUT control device discriminates which group between a first group and a second group the lower data values belong to if the first data discrimination unit discriminates that the lower data values are certain values other than "000000";

a fifth step in which the second switching control units of the LUT control device provide the LUT resultant values as they are to the adders through the first switches, respectively, if the second data discrimination unit discriminates that the lower data values belong to the first group at the fourth step;

a sixth step in which the complement conversion units of the LUT control device convert the LUT resultant values into 2's complements and the second switching control units provide the converted values to the adders through the first switches, respectively, if the second data discrimination unit discriminates that the lower data values belong to the second group at the fourth step;

a seventh step in which the chip reverse unit reverses the lower data values if the first data discrimination unit discriminates that the data values corresponding to the lower three chips H, M and L are certain values other than "000000" at the even-numbered clocks; and an eighth step in which the second LUT address mapper calculates LUT memory values using the lower data values reversed by the chip reverse unit and then performs a mapping of the calculated LUT memory values onto the corresponding LUTs to provide the resultant values by phases of the corresponding LUTs to the corresponding adders, respectively.

14. The control method as claimed in claim 13, wherein the control method is applicable to all structures using a ternary spreading code having a length of $L \geq 1$.

15. The control method as claimed in claim 13, wherein the control method is applicable to all structures in which $k \geq 1$ and which use a 1:k-interpolation FIR filter.

* * * * *